Patented June 1, 1937

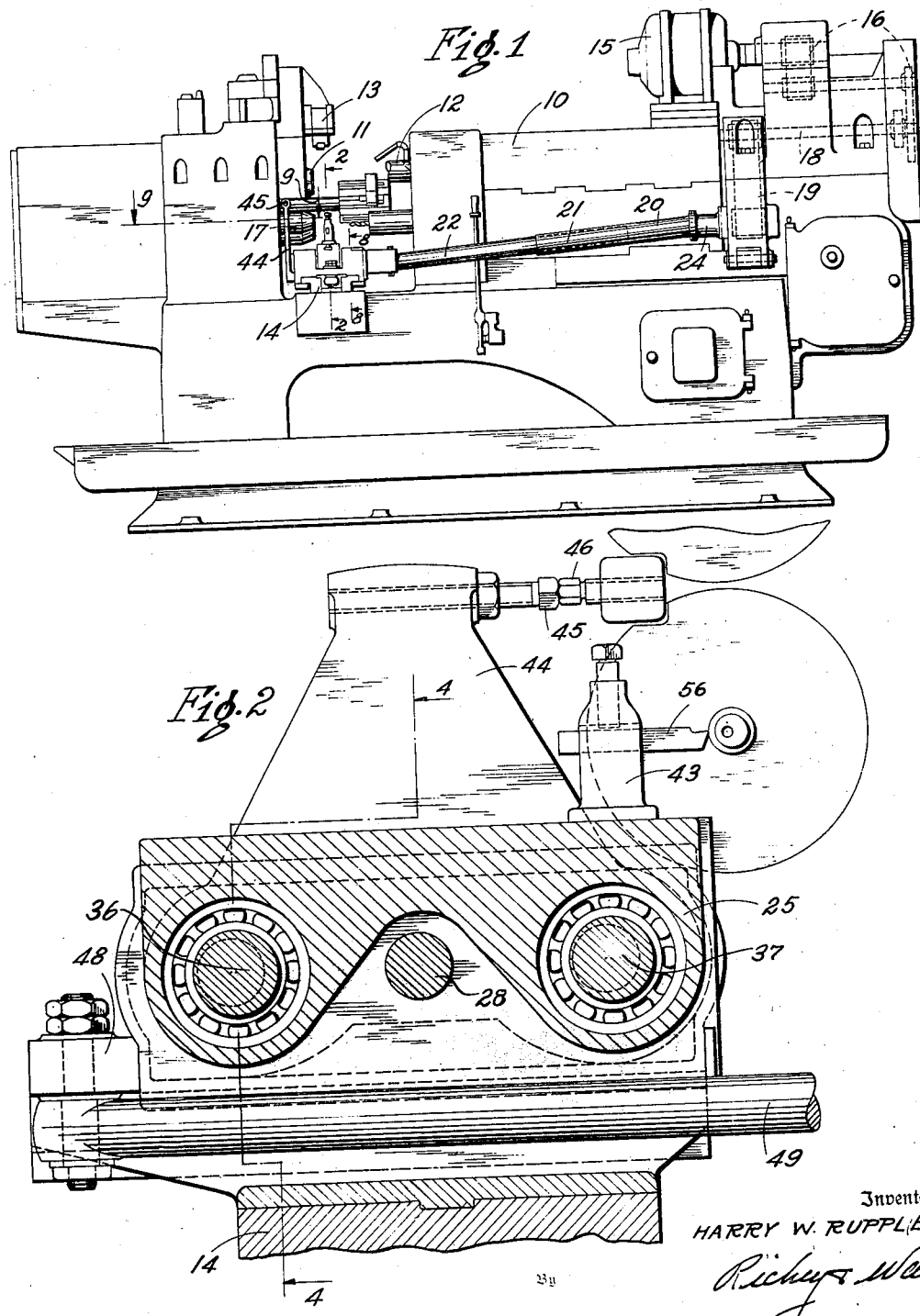

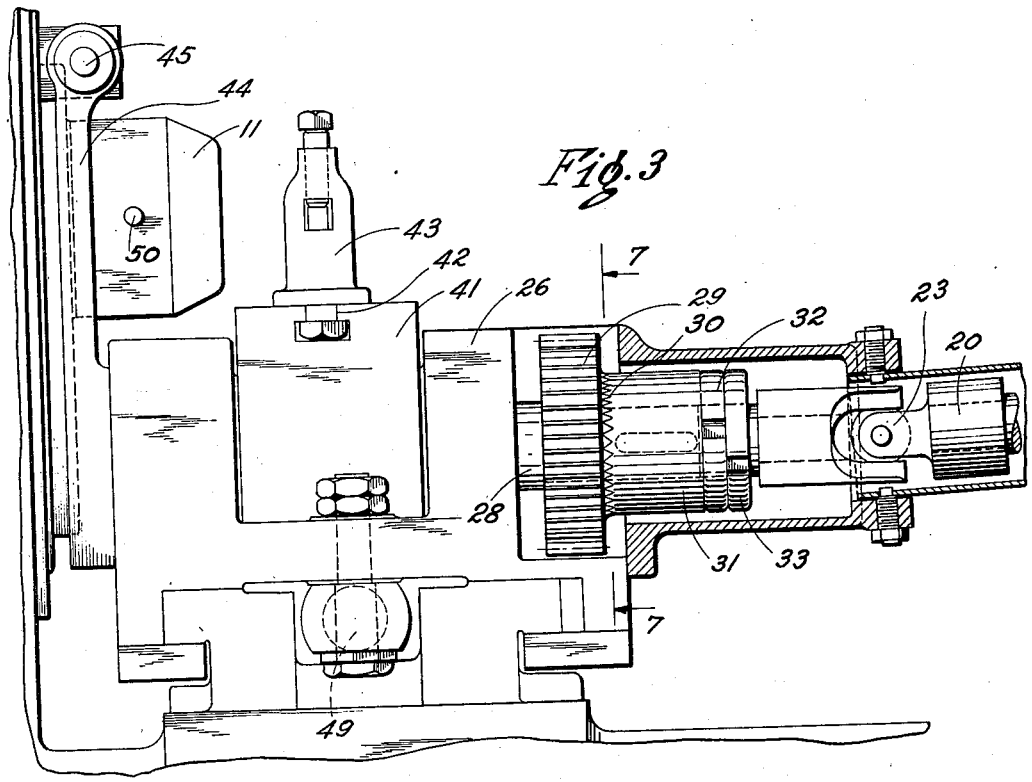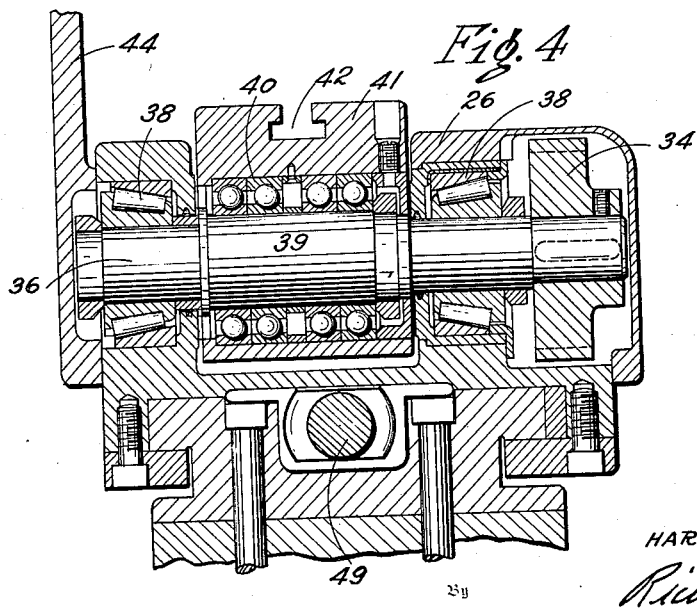

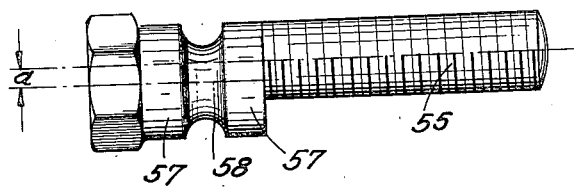
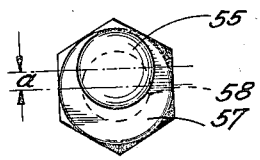
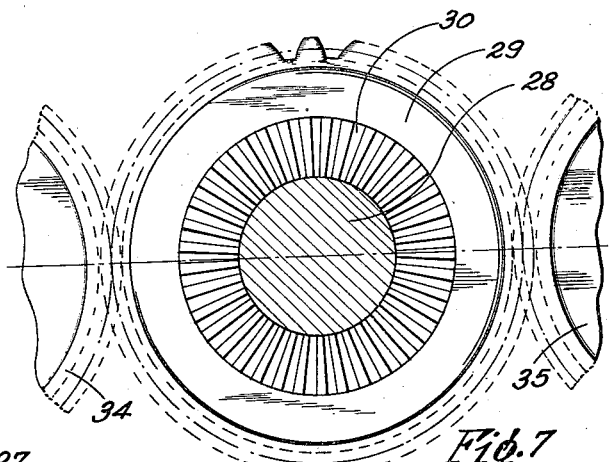
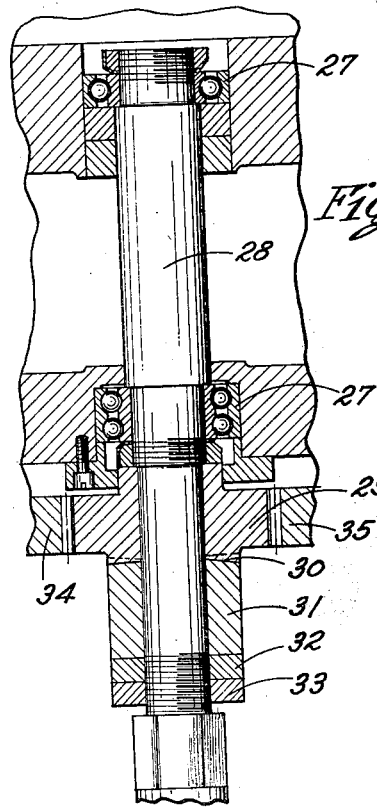
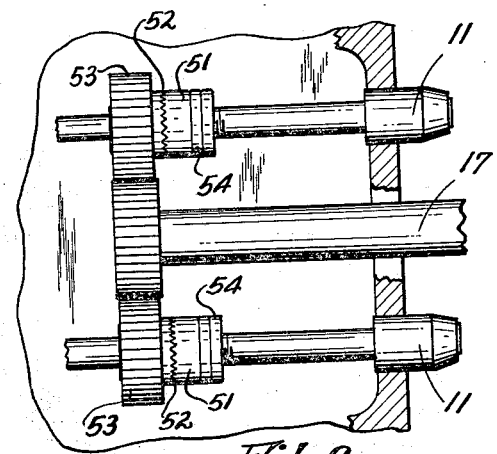

2,082,516

UNITED STATES PATENT OFFICE 2,082,516

TURNING ATTACHMENT

Harry W. Rupple, Shaker Heights, Ohio, assignor to The Cleveland Automatic Machine Company, Cleveland, Ohio, a corporation of Ohio Application May 8, 1936, Serial No. 78,636

7 Claims. (Cl. 29—57)

This invention relates broadly to turning attachments for lathes and similar machine tools and more specifically to mechanisms for turning cams or eccentric sections in the work without rechucking the stock.

One of the objects of the invention is to construct a turning attachment in which the cutting tool is mounted to oscillate in a circular path normal the center of rotation of the work and paraxial thereto so that an eccentric body or cam may be cut in the work during the machining operation.

Another object of the invention is to construct a turning attachment which is provided with mechanisms for neutralizing the clearance in the drive gearing with the driving connections intermediate the lathe chuck and the turning attachment.

Another object of the invention is to provide an organization of anti-friction bearings in the supporting member for the cutting tool, the bearings being so arranged as to resist the vertical and horizontal thrusts imposed by the cutting reactions of the tool.

Another object of the invention is to provide an eccentric turning tool which is adapted for use as an attachment upon an automatic multi-spindle screw machine, the attachment being constructed to facilitate simultaneous or sequential operation with the various other cutters in the tool set so that the work may be completely machined within an operative cycle of the machine.

Other objects and advantages more or less ancillary of the foregoing and the manner in which all the various objects are realized will appear in the following description which, considered in connection with the accompanying drawings, sets forth the preferred embodiment of the invention.

Referring to the drawings in which the preferred embodiment of the invention is illustrated:

Figure 1 is an elevational view of a screw machine embodying the present invention;

Fig. 2 is a vertical section taken on a plane indicated by line 2—2, Fig. 1, shown upon an enlarged scale;

Fig. 3 is an elevational view of the turning attachment illustrated in Fig. 1, a portion of the driving connection being shown in section;

Fig. 4 is a longitudinal sectional view taken on a plane indicated by line 4—4 in Fig. 2;

Fig. 5 is an elevational view of a typical specimen of a work formed by the turning attachment embodying the present invention;

Fig. 6 is an end elevational view of the same;

Fig. 7 is a sectional view through the adjusting mechanism coordinated with the drive, the section being taken on the plane indicated on line 7—7 in Fig. 3;

Fig. 8 is a vertical section taken on the line 8—8 in Fig. 1; and

Fig. 9 is a vertical sectional view through the driving spindle head illustrating the adjustment between the master gear and drive spindle gearing.

Referring to Fig. 1, the machine tool chosen for the purpose of illustrating the present invention embodies an automatic screw machine having a plurality of rotatable work holding spindles 11, a reciprocating tool holder slide 12 and vertical and transverse cross slides 13 and 14 respectively. The machine may be driven by an electric motor 15 as shown, connected with a gear train 16, which is coupled with a spindle drive shaft 17. In the present case the gear train 16 is provided with a power take off shaft 18 embodying a pair of sprockets and drive chain 19 arranged to facilitate the support of a shaft 20 for driving the turning attachment comprising the present invention. The drive shaft 20 is formed with a sleeve splined to and telescopically engaged with a shaft 22 to facilitate the reciprocative movement of the cross slide 14 and to effect the rotative drive of the turning attachment. The outer ends of the shafts 20 and 22 are mounted on universal joints 23 and 24 respectively, which also accommodate movement of the cross slide relative the driving gear 19 therefor.

The turning attachment 25 is mounted upon the cross slide 14 and comprises a housing 26 formed to receive a pair of anti-friction bearings 27 within which there is mounted a shaft 28 which is connected with the universal joint 23 and drive shaft 22. Upon the shaft 28 there is a spur gear 29 having radial serrations 30 upon the outer face thereof which are intermeshed with similar serrations in a collar 31 keyed to the outer end of the shaft 28. The shaft 28 is threaded adjacent its outer end to receive a nut 32 and jam nut 33 for locking the serrated faces of the gear and collar in inter engagement. The gear 29 is meshed with a pair of spur gears 34 and 35 mounted respectively on shafts 36 and 37, which are supported on anti-friction bearings 38 of a type capable of restraining radial and longitudinal thrusts. The central portions 39 of the shafts 36 and 37 are formed eccentric with respect to their medial axes, (see Fig. 2) the eccentricity thereof being equal to the amount of the offset or cam lift desired in the work, as for instance the distance indicated by the dimension "a" in Figs. 5 and 6.

Upon the eccentric portion 39 of the shafts 36 and 37 there is mounted a pair of radial anti-friction bearings 40 which support a tool block 41 formed with a T-slot 42 therein adapted to receive a tool post 43 of any conventional form. As will be seen in Figures 1, 3, and 4, the housing 26 is formed with a medial channel therein to permit the movement of the tool block 41 as it oscillates upon the eccentrics 39 during the rotative movement of the drive shafts 36 and 37. The outer end of the tool block 41 is provided with a bracket 44 having an adjustable set screw 45 in the upper portion thereof adapted for engagement with a screw 46 mounted in boss 47 in the head of the machine structure, being adapted to delimit with micrometric precision the inner movement of the cross slide 14. The outer face of the slide 14 is formed with a boss 48 thereon for the support of a link 49 extending transverse the machine and connected in the usual manner with a cam drum, not shown. This cam and the connecting linkage therefor effect the transverse reciprocation or in and out movement of the cross slide carriage. Inasmuch as the link 49 is of the conventional form and forms per se no part of the present invention and since this construction is of the type usually employed in machines of this character further detailed description thereof is deemed unnecessary herein.

In the present embodiment the jaws of the collets are disposed in eccentric relation to their axis of rotation, the eccentricity being equal to that of the cam height desired in the work, as for instance the dimension "a" shown in the example illustrated in Figs. 5 and 6. The chuck or collet jaws are pinned in place as indicated by the dowels 50 to assure their rigid securement with the spindles 11 upon which the driving gears are fixed. As shown in Fig. 9, the inner ends of the collet spindles are provided with collars 51 having serrations or teeth 52 extending therefrom adapted for engagement with teeth of complementary configuration in the face of the pinions 53 mounted upon the outer ends of the drive shaft. The collar 51 is keyed to the spindles and locked against longitudinal movement by the jam nuts 54, the structure being similar to that of the gear and driving coupling for the shaft 22.

This adjustment is provided to facilitate a more delicate adjustment than is afforded by advancing the pinions a distance equal to that of the width of a single tooth of the driving gear on the shaft 17.

In operation, as heretofore described the stock when chucked in the offset collets is rotated through the eccentric path of revolution of the chuck jaws. The first operation upon the work in the illustrative embodiment comprises turning the outer end of the bar to the thread diameter of the shank portion of the work 55 (see Fig. 5). This operation and the subsequent step of threading the shank of the bar may be performed with any suitable combination of tools formed with the tool slide 12. When the work is indexed to the station in the turret coordinated with the eccentric turning attachment the cross slide 14 is automatically fed into operative position, the tool bit 56 (in the present case is a form tool) engaging the stock and forming the groove and shoulder portions 57 and 58 respectively. It will be borne in mind that only the portion of the stock comprising the shank 55 has, up to this stage, been machined on the axis of rotation of the eccentric chuck jaws and that the periphery of the bar or portions 57 and 58 thereof are still rotating about an axis offset therewith. Since the tool block 41 is oscillated in a circular path in unison with the work and about radii of equal magnitude, the cutting operation will now be concentric the axis of rotation of the inner end of the stock or that portion of the bolt shown in Figs. 5 and 6 identified as 57 and 58. When the cross slide 14 is fed to the desired depth of cut the tool is retracted, whereupon the spindle head is indexed, the work heretofore considered being moved to the cut off position where the operating cycle is completed.

By virtue of the adjustment afforded by the collar 31 and gear 29 and the similar adjusting elements 52 and 53 on the work holding spindles and driving the lost motion between the spindles and driving attachment is so finely divided that a substantially synchronous rotation of the driving and driven parts is effective. Moreover, this organization of driving connections will facilitate taking up the clearance or losses incurred through wear of the driving connections and elongation of the chain driving the shafts 18 and 20.

Although the present invention is illustrated and described in connection with a multiple automatic screw machine, it is obvious that the attachment is adaptable for use with a single spindle screw machine, lathe or other similar machine where it is possible to intergear the turning attachment with the work holding spindle and thus oscillate the tool in timed relation therewith.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:
1. In combination with a multiple spindle screw machine having a drive shaft, a plurality of rotatable eccentric work holding collets driven thereby and a cross slide, a turning attachment for forming eccentric studs comprising a base mounted on said cross slide, a cam shaft journaled thereon, a circular cam on said cam shaft, a tool block mounted on said cam, a cutting tool on said tool block engageable with the stock in said collet, gearing on said drive shaft, yieldable driving connections between said gearing and said cam shaft for rotating said cam shaft synchronously with said drive shaft and means coordinated with said collets and said driving connections for adjusting the eccentricity of the collets with cam.

2. In combination with a multiple spindle screw machine having a drive shaft, a plurality of rotatable eccentric work holding collets driven thereby and a cross slide, a turning attachment for forming eccentric studs comprising a base mounted on said cross slide, a cam shaft journaled thereon, a circular cam on said cam shaft, a tool block mounted on said cam, a cutting tool on said tool block engageable with the stock in said collet, gearing on said drive shaft, yieldable driving connections between said gearing and said cam shaft for effecting the simultaneous rotation of said cam shaft and drive shaft, a toothed flange on said driving connection, a toothed companion flange on said cam shaft engaged with the first named flange and rotatively adjustable therewith, and means coordinated with said collets to rotatively adjust the eccentricity thereof with the eccentricity of said cam shaft.

3. In a multiple spindle screw machine having a cross slide, a drive spindle and a plurality of eccentric collets driven by said spindle, an eccentric turning attachment comprising a base mounted on said cross slide, a cam shaft mounted thereon, a circular cam in said shaft, a tool block mounted on said cam and movable in a circular path thereby, gears on said drive spindle, a shaft connected with said gears, a second shaft telescopically engaged by the first shaft and keyed thereto, toothed driving couplings intermediate said drive shaft and said collets and a toothed driving coupling intermediate said cam shaft and said second named shaft for positioning the eccentricity of said cam relative to the eccentricity of said collets.

4. In a multiple spindle screw machine having a cross slide, a drive spindle and a plurality of eccentric collets driven by said spindle, an eccentric turning attachment comprising a base mounted on said cross slide, a pair of cam shafts mounted therein, gears on said cam shafts, an eccentric circular cam in each of said cam shafts, a tool block mounted on said cams and movable in a circular path thereby, gears on said drive spindle, an extensible shaft connected with said gears, a rotatively adjustable coupling mounted on said base and connected with said extensible shaft, a pinion connected with said coupling and intermeshed with the gears on said cam shafts, the gear ratio between the gears on said cam shafts, pinion and drive spindle being adapted to effect the rotation of the cam shafts at an equal rate of speed with said drive spindle.

5. A turning attachment for a lathe having a rotatable spindle and an eccentric work holding chuck comprising a base, a pair of shafts mounted thereon, gears on said shafts, circular cams on said shafts, a pinion mounted in said base and intermeshed with said gears, a tool block mounted on said cams and movable in a circular path upon rotation of said cams, a drive shaft connected with said pinion, a rotatively adjustable coupling member on said shaft, gearing intermediate said drive shaft and said work holding spindle adapted to rotate said cams at the same rate of speed as said spindle, and a rotatively adjustable coupling intermediate said eccentric work holding chuck and the gearing on said spindle to facilitate the adjustment of the eccentricity of said chuck with said cams.

6. In a screw machine having a drive spindle and an eccentric chuck driven thereby, an attachment for turning an eccentric portion in the work, comprising a base, a shaft journaled thereon, a circular cam thereon, a tool block mounted on said cam and movable in a circular path thereby, operative driving connections between said spindle and said shaft, adjusting means in said driving connection to position the maximum eccentricity of said shaft with the maximum eccentricity of said cam, and means to limit the inward movement of said base.

7. A turning attachment for an automatic screw machine having a rotatable work holding spindle and an automatically reciprocable cross slide, comprising a base, adjustably mounted on said cross slide, a drive shaft mounted therein, a gear on said shaft, a pair of cam shafts mounted in said base, gears thereon intermeshed with said gear on said drive shaft, circular cams on said cam shafts, a tool block mounted on said cams and movable in a circular path upon rotation of said cams, a cutting tool mounted on said tool block effective to rotate said drive shaft at the same rate of speed as said work holding spindle, driving connections intermediate said gearing and said drive shaft, for rotating said shaft, yieldable couplings thereon to facilitate the reciprocative movement of said cross slide and a stop mounted on said base to limit the travel of the base toward the work during the reciprocative movement of said cross slide.

HARRY W. RUPPLE.